Nov. 16, 1965  A. E. KNOTOWICZ  3,218,625
DISPLAY WHEEL FOR CONVERTING BINARY
CODE TO DISPLAY POSITION
Original Filed Jan. 8, 1960  6 Sheets-Sheet 1

FIG. 1

INVENTOR.
ALOYSIUS E. KNOTOWICZ
BY
ATTORNEY

Nov. 16, 1965  A. E. KNOTOWICZ  3,218,625
DISPLAY WHEEL FOR CONVERTING BINARY
CODE TO DISPLAY POSITION
Original Filed Jan. 8, 1960  6 Sheets-Sheet 2

*INVENTOR.*
ALOYSIUS E. KNOTOWICZ
BY
ATTORNEY

INVENTOR.
ALOYSIUS E. KNOTOWICZ
BY
ATTORNEY

Nov. 16, 1965    A. E. KNOTOWICZ    3,218,625
DISPLAY WHEEL FOR CONVERTING BINARY
CODE TO DISPLAY POSITION
Original Filed Jan. 8, 1960    6 Sheets-Sheet 4

INVENTOR.
ALOYSIUS E. KNOTOWICZ
BY
Joseph Weingarten
ATTORNEY

INVENTOR
ALOYSIUS E. KNOTOWICZ
BY
Joseph Weingarten
ATTORNEY

Nov. 16, 1965  A. E. KNOTOWICZ  3,218,625
DISPLAY WHEEL FOR CONVERTING BINARY
CODE TO DISPLAY POSITION
Original Filed Jan. 8, 1960  6 Sheets-Sheet 6

F I G. 12

F I G. 14

F I G. 13

*INVENTOR.*
ALOYSIUS E. KNOTOWICZ
BY
Joseph Weingarten
ATTORNEY

United States Patent Office 3,218,625
Patented Nov. 16, 1965

3,218,625
DISPLAY WHEEL FOR CONVERTING BINARY
CODE TO DISPLAY POSITION
Aloysius E. Knotowicz, Torrington, Conn., assignor to
The Patent Button Company, Waterbury, Conn., a
corporation of Connecticut
Continuation of application Ser. No. 1,369, Jan. 8, 1960.
This application Oct. 1, 1964, Ser. No. 403,437
5 Claims. (Cl. 340—324)

This application is a continuation of my copending application Serial No. 1,369, filed January 8, 1960.

This invention relates in general to apparatus for converting from one numeric system to a different numeric system and more particularly, the invention pertains to an electromagnetic device which in response to input electrical signals coded in accordance with one numeric system provides an output that is a conversion of a number in the first system to a corresponding number in another numeric system.

The present invention contemplates the provision of a data readout device for converting coded data signals from a source such as a computer into a decimal output. The converted output provided by the readout device may be a visual display of a numeral, or an electrical signal, or the converted output may be both visual and electrical. In one embodiment of the invention, a character bearing wheel is affixed to a magnet having salient poles, the magnet and wheel forming a rotor which is mounted in a manner permitting it to rotate freely, and a stationary electromagnetic structure (i.e., a stator) having a plurality of coils corresponding to the number of bits in the input code is arranged so that each number of the input code produces its own unique orientation of the vector representing the direction of the magnetic field established by the stator. The salient pole magnet, under the influence of the magnetic field, rotates until it is aligned with the magnetic field vector and in doing so causes the character bearing wheel to which the magnet is attached to rotate and assume a fixed position. A viewing window is provided in a structure housing the rotor and stator, the window permitting only one of the characters inscribed on the wheel to be visible in its entirety. Characters are located on the wheel in such a manner that for each vector aligned position of the permanent magnet within the stator, a corresponding character is displayed in the window. Adjacent each vector aligned position of the permanent magnet within the stator is a piece of iron or other readily magnetizable material which holds the magnet in an "indexed" position after the electromagnetic field is removed. The number of coils on the stator, their angular position with respect to each other, and the magnetomotive force (M.M.F.) produced by each of the electromagnets is dependent upon the manner in which the input signal is coded. The character which is displayed in the window is dependent upon the vector aligned position within the stator of the permanent magnet, and therefore, the size and location of these characters on the periphery of the wheel is also dependent upon the manner in which the input signal is coded. The character visible in the window is in an uncentered position when the magnet is vector aligned. After the collapse of the electromagnetic field, the magnet moves to its "indexed" position causing the character to be then centered in the window and to there remain until the stator is again actuated by another electrical signal.

The principle of operation of the invention and the manner in which the invention is embodied in a practical device can be better understood by a perusal of the following exposition when considered in conjunction with the appended drawings in which.

The constructional details of a practical embodiment of the invention for converting electrical signals coded in correspondence with a binary system into a visual display of a decimal number which corresponds to the binary value of the input signals are shown in FIGS. 1 to 6B, inclusive, of the drawings.

Figure 12:
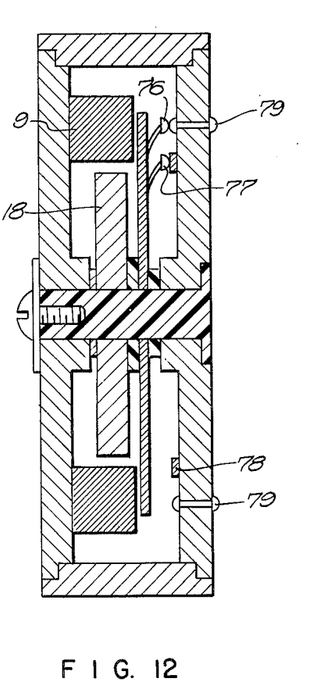
FIG. 12 is a vertical sectional view of an embodiment of the invention modified to furnish electrical output signals rather than an optical display.
Figure 13:
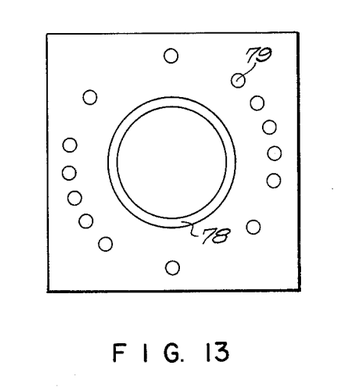
FIG. 13 is a plan view of a portion of the housing in FIG. 12 showing the manner in which the output contacts are arranged to furnish electrical output signals.
Figure 14:
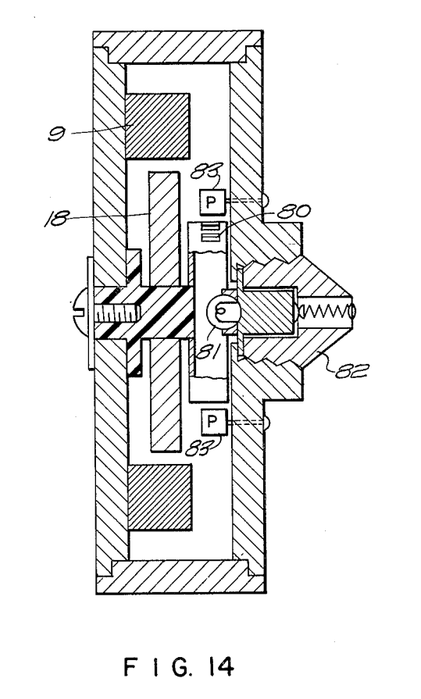
FIG. 14 is a vertical sectional view of an embodiment of the invention modified to employ electro-optical devices rather than mechanical contacts to furnish electrical output signals.

That construction can be combined with the constructional features shown in FIGS. 12, 13, or 14, to provide an indicator which furnishes output electrical signals in addition to the visual display.

Figure 1:
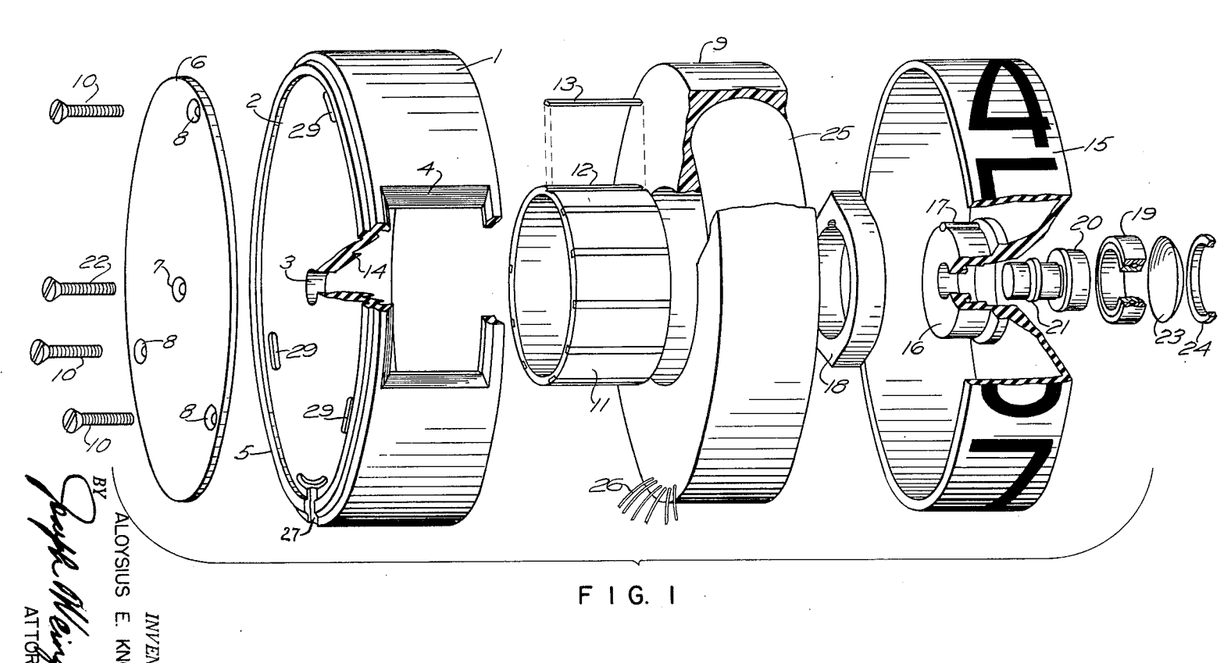
FIG. 1 is an exploded view depicting the various components employed in a practical embodiment of the invention.

Referring now to FIG. 1, which is an exploded view delineating the various components employed in a preferred embodiment of the invention, there is shown a housing 1 formed by a hollow cylinder closed at one end by a wall 2 provided with a central circular aperture 3. The housing is preferably fabricated of a plastic material which can be readily shaped in a mold, as by an injection molding process. Of course, the housing can also be formed from other non-magnetic materials having the requisite mechanical properties. A window 4 is situated in the periphery of the cylinder, the edges of the window being beveled to accentuate its outline and provide an esthetically pleasing appearance. For the purpose of permitting a number of indicators to be interlocked in a side by side arrangement, an annular ridge 5 is formed on the end wall 2 of the housing. The recess formed by the ridge receives a soft iron disc 6 in which there is a central perforation 7 and three other holes 8 symmetrically spaced adjacent the disc's edge. The end wall of housing 1 has three arcuate slots 29 formed therein which can be aligned with the holes 8 in the disc. A stator 9 is depicted in which a portion is broken away to show a winding 25, the winding normally being embedded in a plastic ring. A number of leads 26 are brought out of the plastic ring. While not shown in FIG. 1 these leads are connected to the winding and provide the means for energizing various sections of the winding 25 in a manner later described herein.

Figure 2:
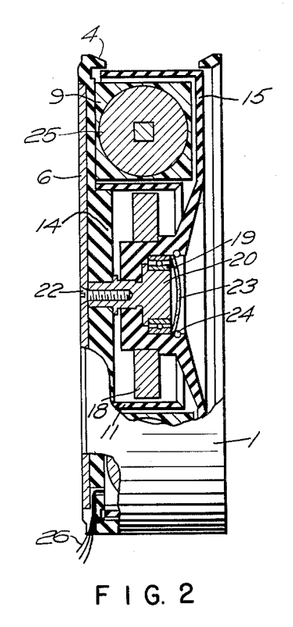
FIG. 2 is a view showing the apparatus of FIG. 1 assembled with parts broken away to expose the interior.

When the device is assembled, as shown in FIG. 2, the stator is secured within the housing 1 by screws 10 (FIG. 1) which project through disc 6 and the arcuate slots in end wall 2. The housing 1 is provided with a channel 27 (FIG. 1) in the wall 2, through which the leads 26 are brought out of the housing. A hollow thin-walled cylinder 11 (FIG. 1), fabricated of nonmetallic material and having an external diameter permitting the cylinder to fit within the stator, is formed with transverse slots 12. A magnetizable element 13, preferably a rectangular bar of soft iron, is pressed or cemented into each slot and the configuration of the element is such that the element precisely fills the slot. As best shown in FIG. 2, end wall 2 is formed with a circular boss 14 over which cylinder 11 fits so that it is concentric with stator 9. Referring again to FIG. 1, there is shown a character bearing wheel 15 having a hub 16 on which is provided a key or spline 17. A permanent magnet 18 is formed with a central aperture in which a keyway is provided so that the magnet fits over the hub and is keyed thereto by spline 17. The magnet and wheel form a subassembly termed a "rotor." The rotor is mounted on a ball bearing 19 which fits upon an arbor 20. The arbor is provided with a collar 21. As shown in FIG. 2, arbor 20 protrudes into the central aperture of end wall 2 and collar 21 is caused to seat firmly against the wall by a screw 22 which extends through disc 6 and engages threads in the arbor. A saucer-shaped cover 23, secured in place by a snap ring 24 prevents dust and dirt from entering the ball bearing. From the view of the assembled device illustrated in FIG. 2, it is evident that the wheel 15 is formed to fit over the stator 9 and that a portion of the wide rim of the wheel is visible in the window 4. As the wheel rotates, the characters are successively displayed in the window.

Figure 3:
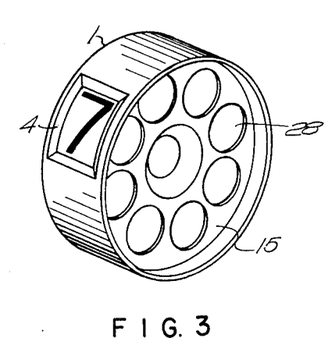
FIG. 3 is a perspective view of the assembled device.
Figure 4:
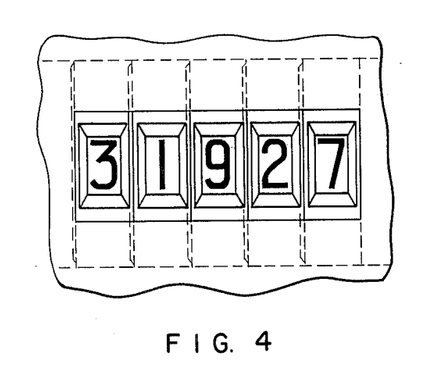
FIG. 4 illustrates the manner in which a plurality of devices, such as the one in FIG. 3, may be arranged side-by-side to form a higher order counter.

A perspective view of the assembly is depicted by FIG. 3. The side wall of wheel 15 visible in the figure is perforated with circular holes 28 to lessen the mass of the wheel so as to make the wheel easier to rotate by reducing its inertia. The device of FIG. 3 can be conjoined with other like devices to form a higher order counter of the type shown in FIG. 4 by arranging the devices side by side so that the annular ridge 5 (FIG. 1) of one device fits within the rim of the housing of the adjacent device. The disc 6 (FIGS. 1 and 2) being fabricated of a magnetically permeable material (e.g. soft iron) acts as a magnetic shield to prevent the rotor of one device from being affected by the magnetic force set up by an adjacent device.

Figures 7A, 8A, 8B:
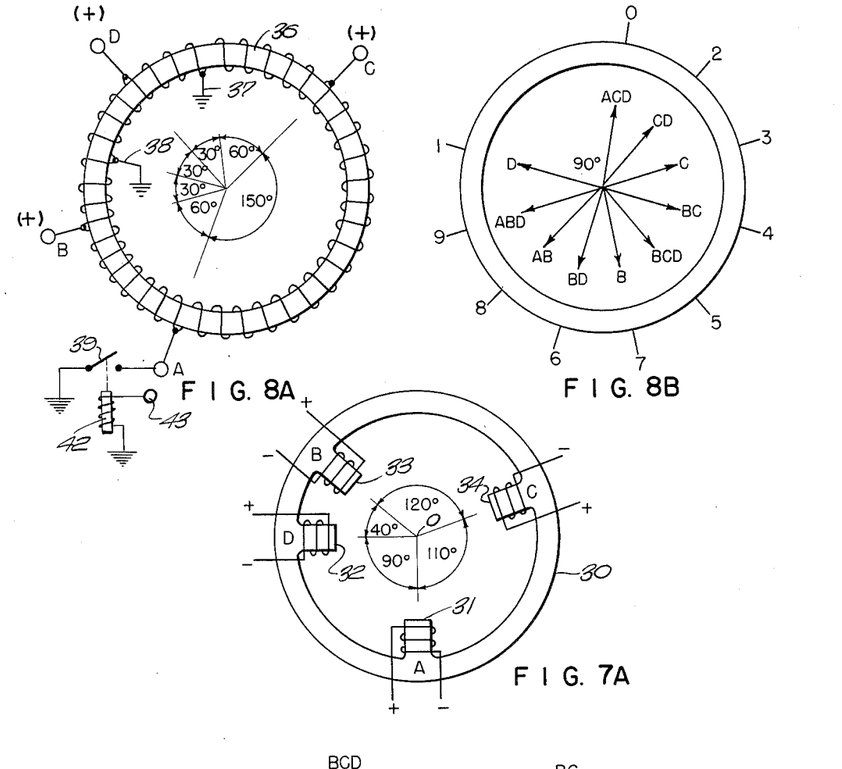
FIG. 7A schematically depicts a salient pole magnetic core with each of the poles carrying a winding.
FIG. 8A schematically depicts a variation of the stator shown in FIG. 7A.
FIG. 8B illustrates ten of the magnetic field vectors which can be produced by energizing the windings of FIG. 8A.
Figure 7B:
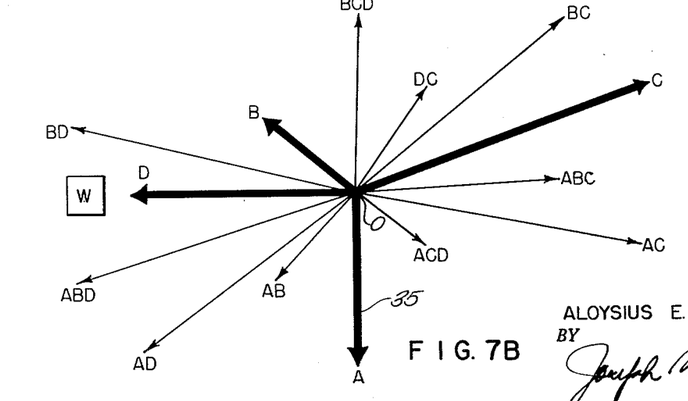
FIG. 7B illustrates the fourteen magnetic field vectors which can be produced by energizing the windings in the stator of FIG. 7A.

The principle of operation of the invention may be apprehended by considering FIG. 7A where there is shown an annulus 30 of ferromagnetic material having inwardly protruding poles 31, 32, 33, and 34, spaced irregularly about the circle formed by the inner wall of the annulus. By way of example, pole 31 is disposed at a 90° angle with respect to pole 32 and at an obtuse angle of 110° with respect to pole 34. The angular spacing between poles 32 and 33 is 40°, leaving a 120° angular spacing between poles 33 and 34 to complete the circle. Disposed about poles 31, 32, 33, and 34 are respective conductive windings A, B, C, and D, each winding having two leads, one of which is denoted (+) positive and the other is denoted negative (−). Assuming that an electrical signal is applied only to winding A, causing a current to flow from the positive lead to the negative lead, a magnetic field will be induced such that pole 31 becomes a north pole and the other poles 32, 33, and 34 become south poles. The vector representing the direction and strength of the magnetic field established between the poles is shown in FIG. 7B by the line 35 having its origin at 0. The letter A at the head of line 35 signifies that this magnetic field vector results from the energization of winding A. A vector designated by more than one letter signifies that the vector is a result of simultaneously energizing two or more windings. For example, the vector ABC results when windings A, B, and C are concurrently energized; the vector BD results when the windings B and D are concurrently energized. In energizing a winding, the direction of current flow in the winding determines whether the pole is a north pole or a south pole. The vector diagram of FIG. 7B is based on the assumption that when windings A, B, C, and D are energized severally or jointly in any combination, the energized pole or poles are invariably of the same polarity. To be more specific, if the directions of the vectors in FIG. 7B represent the south to north directions of the magnetic fields, then the windings must be energized to cause the poles on which they are disposed to become north poles. As a corollary, where the directions of the vectors represent the north to south direction of the magnetic fields, then the windings must be energized to cause the poles on which they are placed to become south poles. By energizing the windings A, B, C, and D appropriately, fourteen magnetic fields can be established whose vector directions through the geometrical center of the annulus are as indicated in FIG. 7B. The length of the vector is a measure of the strength of the magnetic field and it is evident from FIG. 7B that the vectors are of many different lengths. For example, the vector C indicates a strong magnetic field whereas the vector ABC indicates a relatively weaker magnetic field. The ratio of ampere turns of the four windings is such that winding D has twice as many ampere turns as winding B, winding C has three times as many ampere turns as winding B, and winding A has one and one half as many ampere turns as winding B.

Now, where the salient pole magnet 18 (FIG. 1) is mounted in the stator to pivot about the center 0, the magnet tends to align its poles with the vector representing the magnetic field established by the stator. Thus, the magnet can be constrained to assume the fourteen positions defined by the fourteen vectors in FIG. 7B. Each of the vector aligned positions can be used to position a different character in the window 4 (FIG. 1) of the housing 1. Fourteen vectors, therefore, permit fourteen different characters to be engraved on the wheel 15. Where the device is employed to convert from a binary system to a decimal system, only ten of the fourteen vectors need be employed. There are various types of binary systems in use to which the invention can be adapted by merely rearranging the order of the decimal digits on the wheel 15. The following tables indicate which of the four coils in FIG. 7A are to be energized in accordance with a binary system to cause the corresponding decimal digit to be displayed. Table I is directed to the scalar binary system, also known as the standard binary system; Table II is concerned with the Excess–3 binary system; and Table III deals with the Gray binary system which is also known as the reflected binary system.

TABLE I.—SCALAR BINARY

| Arabic Decimal | Coil | | | |
|---|---|---|---|---|
| | A | B | C | D |
| 0 | | | | |
| 1 | | | | X |
| 2 | | | X | |
| 3 | | | X | X |
| 4 | | X | | |
| 5 | | X | | X |
| 6 | | X | X | |
| 7 | | X | X | X |
| 8 | X | | | |
| 9 | X | | | X |

TABLE II.—EXCESS-3

| Arabic Decimal | Coil | | | |
|---|---|---|---|---|
| | A | B | C | D |
| 0 | | X | X | |
| 1 | | X | | X |
| 2 | | X | X | X |
| 3 | | X | X | |
| 4 | | X | X | X |
| 5 | X | | | |
| 6 | X | | | X |
| 7 | X | | X | |
| 8 | X | | X | X |
| 9 | X | X | | |

TABLE III.—REFLECTED BINARY

| Arabic decimal | Coil | | | |
|---|---|---|---|---|
| | A | B | C | D |
| 0 | | | | |
| 1 | | | | X |
| 2 | | | X | X |
| 3 | | | X | |
| 4 | | X | X | |
| 5 | | X | X | X |
| 6 | | X | | X |
| 7 | | X | | |
| 8 | X | X | | |
| 9 | X | X | | X |

It can be observed from the tables that only the Excess–3 code requires coils to be energized to display a "0." In the scalar and reflected binary codes, a "0" is indicated by the absence of any energized coils. Since a magnetic force is required to cause the magnet 18 to turn, some means must be devised where the scalar and reflected binary codes are used, to cause a magnetic force to be set up by the stator when a "0" is to be displayed. The problem of providing a magnetic field for the numeral "0" is resolved in ways described herein in connection with the stators of FIGS. 8A and 9A.

Where two vectors, such as vector A and vector BCD in FIG. 7B differ in direction by 180°, a difficulty arises in the ability of the magnet to align itself with the direction of one of those vectors when the magnet has previously been aligned with the other of these vectors. Assume, for example, that the magnet is initially aligned with vector BCD and the magneitc field establishing vector BCD is replaced by a magnetic field establishing vector A. The magnet must then execute a half revolution to align itself with vector A. However, the only forces acting on the magnet are directed along its longitudinal axis and through the pivot point 0 so that there is an absence of any force or couple to rotate the magnet. Therefore, the magnet does not align itself with the new vector A, but rather retains its original position. In order to resolve this difficulty, the magnet is caused to be slightly displaced from its vector aligned position before the magnet is required to again align itself with another vector. The thin-walled cylinder 11 shown in FIG. 1 and the magnetizable bars 13 embedded in that cylinder are the agency for accomplishing that result.

Figures 5A, 5B:
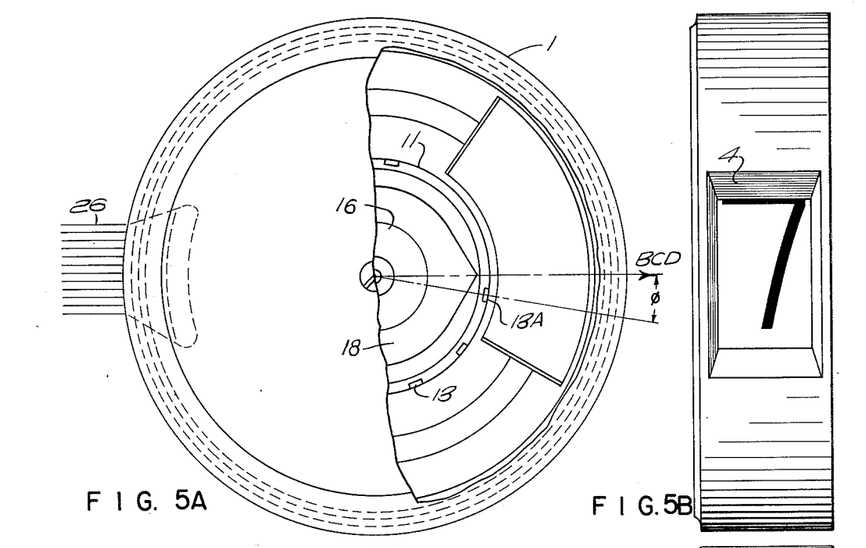
FIGS. 5A and 5B show the position of a numeral in the window when the magnet is aligned with a magnetic field vector.
Figures 6A, 6B:
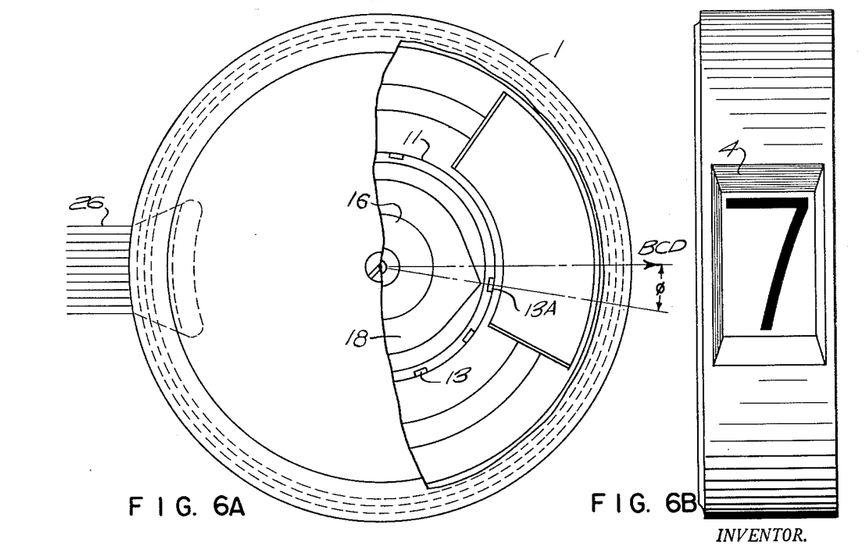
FIGS. 6A and 6B show the position of the numeral in the window when the magnet is aligned with an indexing bar.

The cylinder 11 and the bars 13 are illustrated in FIG. 5A as they appear in relation to the salient pole magnet 18 and the housing 1. Assuming the leads 26 protruding from housing 1 are connected to windings A, B, C and D of FIG. 7A and that windings B, C, and D are energized, the magnetic field vector through the pivot point 0 of the magnet 18 is established in the direction indicated by the vector BCD in FIG. 5A. The magnet 18 aligns itself with vector BCD and remains in its aligned position so long as the magnetic field exists. If the numeral 7 is associated with vector BCD, the magnet, when it is aligned with vector BCD, causes that number to be displayed in the window 4, as shown in FIG. 5, but the number is not centered in the window. When the windings are de-energized, the magnetic field established by the currents in the windings collapses. The salient pole of magnet 18 induces the adjacent soft iron bar 13 in cylinder 11 to be magnetized and the magnet turns until its salient pole is pointed directly at the bar 13A and remains in that position until the windings are again energized to establish another magnetic field. When the salient pole of the magnet points directly at bar 13A, as indicated in FIG. 6A, the numeral 7 is then centered in window 4 in the manner depicted in FIG. 6B. The bar 13A performs two functions: first, it holds the magnet in a fixed position after the windings are de-energized; and second, it causes the magnet to assume a fixed position which is offset from the position of the magnetic field vector. To be more explicit as to that second function, it may be observed in FIGS. 5A and 6A that the bar 13A is offset from the magnetic field vector BCD by the angle $\phi$. Any of the vectors in FIG. 7B, if subsequently established, will cause rotation of the magnet to a new position because the offset position avoids the difficulty, mentioned above, which arises when two vectors differ in direction by 180°.

It is apparent from the vector diagram of FIG. 7B that the angular spacing between vectors is not uniform. For example, the angular spacing between vector BD and vector B is 20° while the spacing between vectors B and BCD is 50°. The significance of the unequal angular spacing is that the characters associated with the vectors must be irregularly spaced about the periphery of the wheel.

Figure 9A:
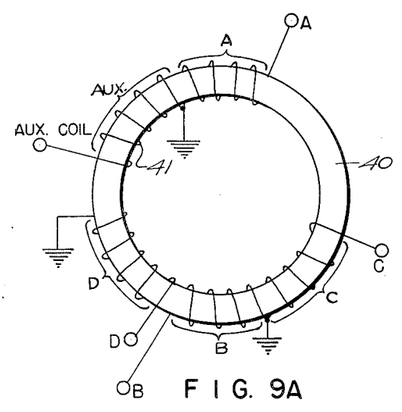
FIG. 9A illustrates a variation upon the stator of FIG. 8B.
Figure 9B:
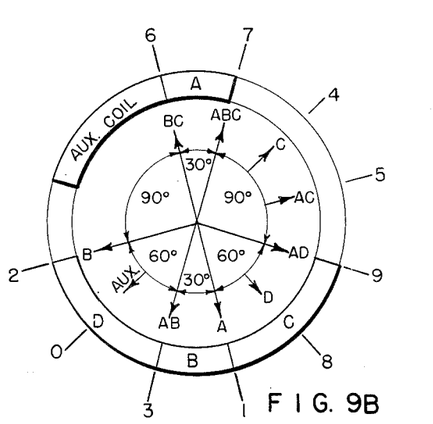
FIG. 9B shows some of the magnetic field vectors which can be produced by energizing the windings of FIG. 9A.

A stator wound in a manner permitting the numerals on the wheel to be spaced at regular intervals is illustrated in FIG. 8A. The stator consists of a ferromagnetic annular core 36 having a winding thereon tapped at four points to provide terminals A, B, D, and C, the winding being grounded at two other points 37 and 38. The angular displacements between the terminals A, B, C, D, and the grounded points 37 and 38 is indicated in FIG. 8A. The ratio in ampere turns of the various sections of the winding is as follows: (1) the section between terminals A and B (section AB) has the same number of turns as the section between terminals B and D, (section BD), (2) the section between terminals D and C (section CD) has one and one half as many ampere turns as section AB, (3) and the section between terminals C and A (section CA) has two and one half as many ampere turns as section AB. Since the ampere turns for any section of the winding is the number of turns multiplied by the current flowing therein, either the number of turns, or the current, or both the current and the number of turns may be varied to achieve the desired ratio. In most applications, the most practical method of attaining the desired ratio is to maintain the current at a constant value and vary the number of turns in the winding. The number of ampere turns for any section must be at least such that the core is saturated by magnetic flux when any one of the sections is energized. The terminals in FIG. 8A are designated A, B, C, and D in order to provide a key to Table I, II, and III, supra. The terminal A is connected to one side of a normally open switch 39 having its other side grounded. In operation terminals B, C, D are energized by applying a voltage thereat and terminal A is "energized" by being grounded. A relay 42 may be arranged to actuate switch 39 when an electric signal is applied at terminal 43. Where terminal A is to be "energized," in conformity with any of the tables, a voltage is applied to terminal 43 to cause switch 39 to close and ground terminal A. In actuality, therefore, it is not terminal A which is energized, but rather the relay 42 which is energized whenever an $x$ appears in column A of the tables. By energizing the terminals in conformity with those tables, the appropriate arabic decimal numeral can be displayed on the window. Of course, the arabic characters must be arranged around the wheel in a different order for each one of those tables. FIG. 8B illustrates the ordering of the arabic numeral on the wheel for the reflected binary code of Table III and the arrows in the figure represent the directions of the magnetic field vectors established by the coils when energized in conformity with that table. For example, to display the numeral "5," terminals B, C, and D are energized to establish the vector BCD and cause the salient pole magnet to align itself with that vector. It is apparent from Table III that in accordance with the reflected binary code none of the coils should be energized for numeral "0." However, a magnetic force is necessary to cause the salient pole magnet to rotate from another position to the "0" position. Since, of the fourteen possible field vectors which can be established, only nine are used for the numerals 1 to 9, one of the other five field vectors is available for the "0" position. As the vector ACD provides a position 30° removed from vector CD, the vector ACD is used to establish the "0" position and terminals A, C, and D, therefore, must be energized to cause a "0" to be displayed. A modified type of stator which may be employed in the invention is depicted in schematic form by FIG. 9A. The stator is constituted by an annular core 40 of ferromagnetic material upon which coils A, B, C, D, and an auxiliary coil 41 are disposed. One end of each coil is connected to ground and the energizing signal is applied between the other end of the winding and ground. For ease of exposition, it is assumed that the energizing signals are invariably of positive polarity with respect to ground. In order to obtain magnetic field vectors through the origin 0 at 30° intervals, the coils are arranged as indicated in FIG. 9B. Coils A and B are diagonally opposed and each of those coils extends over an arc of thirty degrees. Coils D and C abut and are disposed on opposite sides of coil B. Coils D and C each extend over an arc of sixty degrees. Auxiliary coil 41 abuts one end of coil A and extends about sixty degrees toward the nearer end of coil D. Coils A, B, C, and D of FIG. 9A correspond to the similarly lettered windings in FIG. 7A, but the auxiliary coil 41 has no counterpart in the stator of FIG. 7A. The ratio of ampere turns of the coils in FIG. 9A is such that coils C, D, and the auxiliary coil have the same number of ampere turns whereas coils A and B each have one half as many ampere turns as any one of the other coils. The number of ampere turns for any single coil must be such that the magnetic flux due to the energization of the single coil will saturate the core.

FIG. 9B illustrates the directions of the magnetic field vectors established by energizing the coils in conformance with the following table based upon the scalar binary code:

TABLE IV.—SCALAR BINARY

| Arabic Decimal | Aux. | Coil | | | |
|---|---|---|---|---|---|
| | | A | B | C | D |
| 0 | x | | | | |
| 1 | x | x | | | |
| 2 | x | | x | | |
| 3 | x | x | x | | |
| 4 | | | | x | |
| 5 | x | | | x | |
| 6 | | | x | x | |
| 7 | x | x | x | | |
| 8 | | | | | x |
| 9 | x | | | | x |

Figure 10:
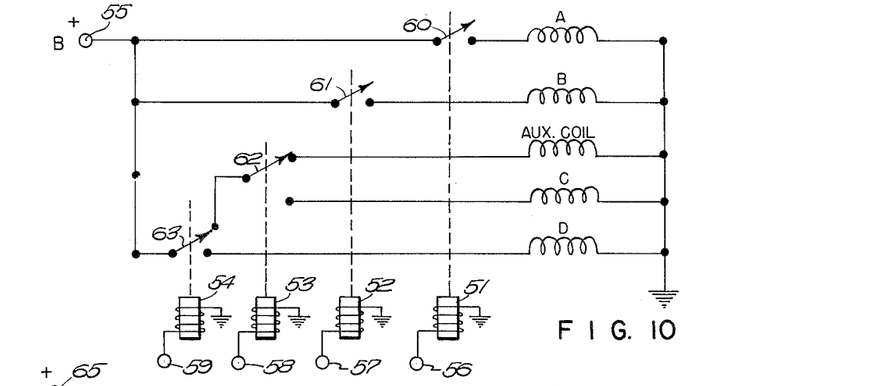
FIG. 10 illustrates a scheme employing electro-mechanical relays for controlling the energization of the windings in the stator of FIG. 9A.

The decimal numerals arranged about the periphery of the core in FIG. 9B signify the numeral which is displayed in the window when the salient pole magnet 18 (FIG. 1) is aligned with the corresponding magnetic field vector. For example, where coils B and C are energized, the numeral "6" would be displayed in the window; in order to display the number "9," coil A and coil D must be energized; and to display a "0," only the auxiliary coil is energized. It will be noted, from Table IV, that the auxiliary coil is not employed whenever coil C or coil D is energized (i.e. numbers 4, 5, 6, 7, 8, and 9), but the auxiliary coil is energized whenever any other number is to be displayed (i.e. numbers 0, 1, 2, and 3). To operate a display device employing a stator of the FIG. 9A type, the schemes illustrated in FIGS. 10 or 11 can be employed to control energization of the coils on the core. In the scheme of FIG. 10, four relays 51, 52, 53, and 54 are utilized to connect the coils A, B, C, and D to a terminal 55 at which an electric potential (B+) is available. By impressing signals at the input terminals 56, 57, of relays 51 and 52, movable contacts 60 and 61 are closed causing coils A and B to be energized from terminal 55. The movable contacts 62, 63 of relays 53 and 54 are arranged so that the auxiliary coil is connected to terminal 55 in the absence of a signal at the input terminal of either of those relays. When a signal is impressed at the input terminal 58 or 59, the movable contact 62 or 63 is pulled down, causing the auxiliary coil to be disconnected from terminal 55 and coil C or D to be there connected. The absence of input signals at terminals 56, 57, 58 and 59 does not mean the absence of any magnetic force in the stator since the auxiliary coil is normally connected to terminal 55 so that a magnetic field vector is present in the stator though no other coils are energized. When the auxiliary coil only is energized, the numeral "0" is displayed in the window.

Figure 11:
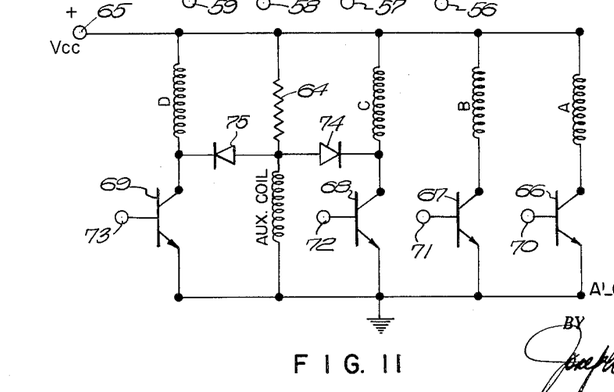
FIG. 11 illustrates an alternative scheme for accomplishing the same purpose by employing transistor switches rather than slower acting electro-mechanical relays.

FIG. 11 illustrates an alternative scheme employing semiconductor devices permitting somewhat faster switching than can be accomplished with the relays of FIG. 10. As shown in FIG. 11, the auxiliary coil is connected by a current limiting resistor 64 to a voltage $V_{cc}$ available at terminal 65. Four switching transistors (here shown as NPN type transistors) 66, 67, 68, and 69 have their emitters grounded and their collectors connected respectively through coils A, B, C, and D to terminal 65. The transistors are controlled by signals applied to input terminals 70, 71, 72, and 73 connected to the bases of the transistors. The bases are so biased that the transistors are normally cut off. The no signal condition of the circuit is therefore such that all the transistors are cut off, and neglecting $I_{co}$ currents because their magnitudes are small, the quiescent current passes through resistor 64 and the auxiliary coil. By applying a signal of appropriate polarity at terminals 70, 71, 72, and 73 the coils A, B, C, and D can be energized by currents passing through their associated transistors. Two diodes 74 and 75 are connected to the ungrounded end of the auxiliary coil, the diode 74 being connected to the collector of transistor 68 in a manner such that the current through the auxiliary coil is shunted by causing the transistor 68 to conduct a current and the diode 75 being connected to the collector of transistor 69 so that the current through the auxiliary coil is shunted by causing the transistor 69 to conduct a current. This result ensues because the emitter-to-collector resistance of the transistor 68 or 69 becomes very small when the switching transistor is forwardly biased by an impressed signal. By employing diodes 74 and 75, the auxiliary coil is effectively de-energized whenever coil C or D is energized by a current flowing through its associated transistor 68 or 69. Many other arrangements for energizing the coils of the stator of FIG. 9A in any desired sequence can be employed. The energizing circuits depicted in FIGS. 10 and 11 are exemplars of circuits which may be utilized in conjunction with display devices embodying the FIG. 9A stator.

From the foregoing descriptions of the various embodiments of the invention, it is apparent that the numerals or other characters are located on the wheel 15 in such a manner that for each vector aligned position of the salient pole magnet 18 within the stator, a corresponding character is displayed in the window 4. There also may be, adjacent to each vector aligned position, a small bar of iron or other magnetizable material to hold the magnet in position when the magnetic field collapses. Where the input signals are not terminated until displaced by other input signals, a magnetic field will always be present in the stator so that the iron bars can be eliminated if desired. In this latter case (i.e. where the input signals are terminated only by other input signals) the circuits of FIGS. 10 and 11 are especially useful because the auxiliary coil is energized at all times except when coil C is energized. The operation of the invention is dependent upon the field created within the stator and the alignment of the salient pole magnet within the field. The magnitude and direction of the magnetic field established by the stator is a function of the stator's configuration, the ratio of ampere turns of the coils, the type of core structure, and the manner in which the coils are energized.

While a specific embodiment of the invention providing a visual display is illustrated in FIGS. 1 and 2, the invention need not be limited to this type of output but may be modified as shown in FIG. 12 to provide an electrical output. For example, the wheel 15 (FIG. 1) in lieu of or in addition to having graven characters thereon, can bear a pair of contacts 76, 77 and the housing 1 may be provided with a conductive ring 78 and with stationary contacts 79 arranged as shown in FIG. 13 on a circle concentric with the ring 78 and so disposed that when the magnet 18 is vector aligned or aligned with one of the indexing bars 13, the contacts on the wheel complete a circuit through one of the stationary contacts on the housing.

Another variation of the invention can be constructed as in FIG. 14 where the output is obtained by employing photocells 83 arranged in the manner of the stationary electrical contacts of FIG. 13, providing the wheel 15 with a slit 80, and providing a light source 81 in the interior of the wheel. For convenience in changing the light bulb 81, a lamp base 82 is arranged so that it can be easily removed from the housing. For each vector aligned or indexed position of the magnet 18, the slit 80 is positioned to permit light to fall upon one of the photocells. The photocells may be either photoconductor or photovoltaic cells, the preference of one type over the other usually being determined by circuit considerations.

In view of the multitude of ways in which the invention can be embodied, it is not intended that the scope of the invention be restricted to the precise structure illustrated in the drawings or described in the specification. Rather it is intended that the scope of the invention be delimited by the claims appended hereto and to include such structures as do not in essence fairly depart from the invention there defined.

What is claimed is:
1. In an electromagnetic indicator of the type utilizing
   a stator having electrically energized windings mounted upon an annular core for selectively establishing a plurality of discretely oriented magnetic fields, and
   a rotor having a salient pole magnet mounted to pivot within the annular core whereby the magnet rotates into alignment with the magnetic field established by the stator,
the improvement whereby the indicator responds to a group of simultaneous electrical signals by displaying its equivalent value in decimal form, the electrical signals being coded in accordance with a binary system so that each signal of the group represents one bit in the binary code, the improvement residing in
   employing a stator whose annular core has a plurality of inwardly extending poles arranged asymmetrically about the annulus, the number of poles corresponding to the number of bits in the group of electrical signals, each pole having on it a separate electrically energizable winding,
   and means for applying each bit in the group of electrical signals to a different one of the windings.

2. In an electromagnetic indicator of the type utilizing
   a stator having electrically energized windings mounted upon an annular core for selectively establishing a plurality of discretely oriented magnetic fields, and
   a rotor having a salient pole magnet mounted to pivot within the annular core whereby the magnet rotates into alignment with the magnetic field established by the stator,
the improvement whereby the indicator responds to a group of simultaneous electrical signals, the electrical signals being coded in accordance with a binary system so that each signal of the group represents one bit in the binary code, the improvement residing in
   employing a stator whose annular core has a plurality of inwardly extending poles arranged asymmetrically about the annulus, the number of poles coreresponding to the number of bits in the group of electrical signals, each pole having on it a separate electrically energizable winding whose number of ampere turns is different from the other pole windings,
   and means for applying each bit in the group of electrical signals to a different one of the windings.

3. In an electromagnetic indicator of the type utilizing
   a stator having an annular core and means upon the core for selectively establishing a plurality of discretely oriented magnetic fields, and
   a rotor having a salient pole magnet mounted to pivot within the annular core whereby the magnet rotates into alignment with the magnetic field established by the stator,
the improvement whereby the indicator responds to a group of simultaneous electrical signals coded in accordance with a binary system, each signal in the group corresponding to one bit in the binary code and being at one of two different levels in accordance with its binary value, the improvement residing in
   employing a winding having its turns uniformly wound around the annular core as the means for establishing the plurality of discretely oriented magnetic fields,
   a plurality of signal input terminals corresponding in number to the bits in the binary code, each signal input terminal being connected to a different tap on the core winding,
   and the core winding having other taps connected to a reference potential.

4. In an electromagnetic indicator of the type utilizing
   a stator having an annular core and means upon the core for selectively establishing a plurality of discretely oriented magnetic fields, and a rotor having a salient pole magnet mounted to pivot within the annular core whereby the magnet rotates into alignment with the magnetic field established by the stator, the improvement whereby the indicator responds to a group of simultaneous electrical signals coded in accordance with a binary system, each signal in the group corresponding to one bit in the binary code and being at one of two different levels in accordance with its binary value, the improvement residing in employing separately energizable windings wound upon the annular core of the stator as the means for establishing the plurality of magnetic fields, the windings corresponding in number to the bits in the binary code, each winding being wound upon a different segment of the core, each winding having one end connected to a common reference potential and the other end arranged to receive an input signal, and an auxiliary winding disposed upon the annular core for establishing a magnetic field in the absence of energization of the other core windings.

5. In an electromagnetic indicator of the type utilizing a stator having an annular core and means upon the core for selectively establishing a plurality of discretely oriented magnetic fields, and a rotor having a salient pole magnet mounted to pivot within the annular core whereby the magnet rotates into alignment with the magnetic field established by the stator, the improvement whereby the indicator responds to a group of simultaneous electrical signals coded in accordance with a binary system, each signal in the group corresponding to one bit in the binary code and being at one of two different levels in accordance with its binary value, the improvement residing in employing a stator having a plurality of separately energizable windings disposed asymmetrically upon its annular core, each winding having one end connected to a common reference potential and the other end arranged to receive an input signal, a source of electrical potential, and a plurality of relays, each relay being responsive to one signal of the group of coded electrical signals, and the relays causing the input ends of the windings to be connected to or disconnected from the electric potential source in correspondence with the coded electrical signals.

References Cited by the Examiner
UNITED STATES PATENTS

| | | | |
|---|---|---|---|
| 1,402,797 | 1/1922 | Roschach | 340—319 |
| 2,827,626 | 3/1958 | De Motte | 340—324 |
| 2,943,313 | 6/1960 | Gordon | 340—325 |
| 3,089,131 | 5/1963 | Morgan | 340—319 |

NEIL C. READ, *Primary Examiner.*